3,015,643
Patented Jan. 2, 1962

3,015,643
REACTION PRODUCT OF A POLYSPIRANE RESIN WITH A POLYCARBOXYLIC ACID ANHYDRIDE, MIXTURES THEREOF WITH OTHER POLYMERIC MATERIALS, PROCESS FOR PREPARING SAME, AND CONDUCTOR COATED THEREWITH
Albert H. Markhart, Wilbraham, Charles F. Hunt, Springfield, and Edward Lavin, Longmeadow, Mass., assignors to Shawinigan Resins Corporation, Springfield, Mass., a corporation of Massachusetts
No Drawing. Filed Aug. 11, 1958, Ser. No. 754,173
28 Claims. (Cl. 260—42)

This invention pertains to an organic resin composition. More specifically it pertains to a novel organic material comprising a modified polyspirane composition which is particularly suitable for electrical conductor insulation, the method of manufacture of such conductor insulation, and the use of such conductors having this insulation material thereon.

It has been well known in the art to apply resin coatings to electrical conductors for the purpose of electrically insulating such conductor from its surroundings. Both organic and inorganic coating materials have been used depending upon such factors as temperature service, particular atmospheric exposure and the mechanical manipulations which the coated wire must withstand either in the fabrication of the electrical device or its subsequent service. The particular physical and chemical properties which the insulation in the present application possesses are substantially superior heat stability, cut-thru temperature, and solvent resistance. Such a combination of improved properties in insulation is certainly surprising as well as desirable.

The primary object of this invention is the provision of an organic resin composition particularly suitable for wire enamel coatings having suitable stability both at high and low temperatures. Another object of this invention is to provide a resinous film, which at high temperatures, maintains its characteristic of being continuous, hard, flexible, and solvent resistant.

The objects of this invention can be accomplished by using as the resin composition a modified polyspirane resin comprising the reaction product of a polyspirane resin with a polycarboxylic acid anhydride either alone or in combination with other polymers in order to impart certain special chemical and physical properties which may be desired.

The term "anhydride" as used in this description of the invention includes both the acid anhydrides of aliphatic and cyclic polycarboxylic acids as well as the acid dianhydrides of polycarboxylic acid compounds containing more than two carboxyl groups. The anhydride compounds that are useful in the practice of this invention are not limited merely to the anhydrides of organic acids in the sense that certain polymeric materials containing anhydride groups are also suitable.

The reaction product of a polyspirane with the type of acid anhydride material mentioned possesses the very desirable properties which makes it an excellent dielectric, and it can be produced in film form without the aid of other polymer materials. The addition of other polymers can improve certain of these properties, however, as will be shown in later examples.

The particular polyspirane resin that is acceptable in the practice of this invention can be represented by the following general formula:

where R is taken from the group consisting of hydrogen and methyl groups, R' is taken from the group consisting of the aliphatic hydrocarbons defined by $(CH_2)_S$, where S is an integer from 0–8 and alicyclic and aromatic hydrocarbons of 5–6 carbon atoms and derivatives thereof, $X+Y$ is equal to an integer from 2 to 100 and Y is an integer equal to no more than 50% of $X+Y$. The acceptable molecular weight range for this invention is 400–20,000.

The class of organic acid anhydride materials that is useful in the present invention for reaction with the polyspirane resins is very broad and includes both substituted and unsubstituted polycarboxylic acid anhydrides and those polymers comprising polymeric polyanhydrides. The reason for the suitability of such a broad class of materials is believed to be the dual function of a polycarboxylic acid anhydride material in the resin, namely, that of a catalyst in promoting the direct reaction of active groups available in the resin as well as that of chemically reacting with the polyspirane resin. The particular reaction which modifies the polyspirane resin and thereby makes it useful for the objects of this invention is commonly known in the art as the cure reaction and results in a substantially crosslinked product. The scope of the class of acid anhydride materials suitable for reaction with a polyspirane resin will be more clearly defined in the succeeding examples and in subsequent discussions thereon. The suitable acid anhydride materials will furthermore be referred to as curing agents hereinafter for ease of reference.

The addition of other polymer materials to polyspiranes containing polyfunctional organic acid anhydrides improves certain physical and chemical properties of the resin product dependent largely upon the composition of the particular polymer added. Although only certain phenolic resins, epoxy resins and polyurethanes were used in combination with the modified polyspirane compositions, it is believed that other resin additives and combinations thereof would also be suitable to enhance certain desirable properties. The effect of some of the various polymer additives on physical and chemical properties of the polyspiranes will be described in the following examples.

The invention is practiced in a specific embodiment as illustrated in the following examples, but is not limited thereto.

EXAMPLE 1

*Preparation of the poly(glutardiylidene pentaerythritol) resin*

480 gms. of technical pentaerythritol, which is a mixture of 88 parts by weight of the mixture of monopentaerythritol and 12 parts of dipentaerythritol is charged to a 5-liter flask equipped with a reflux column along with 1384 gms. of a 24% by weight aqueous solution of glutaraldehyde having a pH between 2.5–4 and in addition, 1200 gms. of distilled water. The mixture is heated to reflux and the contents stirred, by which time the technical pentaerythritol has all dissolved. The catalyst 7.4 gms. of oxalic acid, a water soluble organic acid, is added to the boiling solution. Within a period of five minutes after the addition of the acid catalyst, insoluble resin particles have already formed. The reaction is substantially completed within two hours. The resin is then filtered, washed with water until neutralized, and dried. The resin is a white powder with a melting point of at least 200° C.

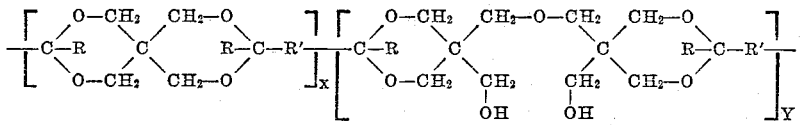

The quantitative analysis for the carbon, hydrogen and oxygen content of the compound yielded 58.4%, 8.2%, and 35.4% respectively, which is in close agreement with the theoretical values for the compound.

*Preparation of the wire enamel*

For the preparation of a wire enamel the following procedure is used:

Into a 2-liter, round-bottomed flask equipped with a stainless steel condenser and a motor driven stirrer is placed 488 ml. of cresylic acid and 155 ml. of naphtha. To the solvent mixture is added 150 gms. of poly(glutardiylidene pentaerythritol). The contents are then stirred, heated to 50–100° C., and held in that temperature range for approximately 1–5 minutes, at which time the heating is discontinued. 7.5 gms. of pyromellitic dianhydride, the curing agent, are added directly to the resin batch with continued stirring. After solution of the curing agent is discontinued and the hot resin solution is then filtered through a Buchner funnel lined with felt and into the final enamel container.

The wire enamel prepared in Example 1 was applied to No. 18 magnet wire and subjected to the standard tests of acceptance for this application. The wire enamel was applied to the wire and cured with heat by conventional means. The following data in Table I represents the comparative results of thermal properties tests between the polyspirane coating and a coating of polyvinyl formal-phenolic resin applied to the same size wire in the same manner.

TABLE I

| Sample (with a 2.8 mil build) | 1 kv. Heat Life Test (Hrs.) | | | Flexible Life (Hrs.) | Cut-Thru Temperature (° C.) |
|---|---|---|---|---|---|
| | 240° C. | 200° C. | 180° C. | | |
| Polyspirane | 110 | 856 | >5,000 | 109 | 270 |
| Polyvinyl Formal-Phenolic | 27 | 110 | 400 | 20 | 221 |

The 1 kv.-life tests were made in accordance with the provisions of the A.I.E.E. (American Institute of Electrical Engineers) specifications No. 57, dated October, 1955, and the test is a measure of the period for which a coating can be exposed at the particular temperature indicated before it will fail as electrical insulation upon the application of 1000 volts to the sample.

The cut-thru temperature is also an A.I.E.E. test for thermal plastic flow whereby crossed coated wires are mechanically loaded while the ambient temperature is raised until electrical contact is made between the metallic substrates of the wires. The flexible life is a modified A.S.A. (American Standards Association) test whereby the embrittlement characteristics of the coating are measured by exposure to elevated temperatures by wrapping around a circular mandrel. It can be observed from the data in Table I that the polyspirane resin performance was superior to the polyvinyl formal-phenolic resin in all thermal properties.

The above cured polyspirane coating possessed excellent resistance to the action of the usual solvents utilized to test the chemical stability of an electrical insulating film. When the film was subjected to a 16 hour immersion in liquified monochlorodifluoromethane, no blisters were found and the weight percent of the film extracted was exceptionally low. Immersion of the film in both boiling methanol and boiling toluene for a period of two hours in each of the liquids resulted in very low weight percent extractibles.

EXAMPLE 2

The same procedure is followed as described in Example 1 for both the preparation of the polyspirane resin and the wire enamel, except that in the latter preparation 6 ml. of an 84% by weight solution of zinc naphthenate in a hydrocarbon solvent is added to the cooled enamel batch after the filtration step.

Wire samples made up of the heat cured product from the above batch in contrast to like samples made up from a batch containing the same amount of pyromellitic dianhydride but not containing the zinc naphthenate had a cut-thru temperature of 300° C. in comparison to 270° C. for the latter. The zinc naphthenate additive also raised the abrasion resistance from 30 strokes to 60 strokes and promoted a faster rate of cure for the resin film.

EXAMPLE 3

The same procedure is followed as described in Example 1 for both the preparation of the polyspirane resin and the wire enamel except that in the latter preparation in substitution for the pyromellitic dianhydride, 7.5 gms. of maleic anhydride is used and 3 gms. of salt-free poly(tetrafluoroethylene) as a 65% by weight aqueous dispersion is added to the cooling resin batch after the pyromellitic dianhydride addition. The poly(tetrafluoroethylene) is added while stirring the enamel batch.

EXAMPLE 4

The same procedure is followed as described in Example 1 for both the preparation of the polyspirane resin and the wire enamel except that in substitution for the polyspirane resin prepared in the manner heretofore described, 150 gms. of poly(glutardiylidene pentaerythritol) prepared with a nonionic emulsifier and a different polymerization catalyst is used.

The preparation of the poly(glutardiylidene pentaerythritol) used in the present example is as follows:

1176 gms. of glutaraldehyde, a 25% aqueous solution having a pH of 4.0, is reacted with 423 gms. of a mixture of pentaerythritols, the mixture containing 88% by weight of the mixture of monopentaerythritol and 12% of dipentaerythritol. The glutaraldehyde pentaerythritol mixture is added to 2040 ml. of distilled water and the contents heated to reflux in the presence of 35.9 gms. of a nonionic emulsifier, consisting of a copolymer of ethylene oxide and propylene oxide. 12.2 gms. of hydrogen lauryl sulfate catalyst is added to initiate the reaction after reflux is achieved. The resin is then filtered, washed with water until neutralized, and dried. The resin is a white powder with a melting point of at least 250° C.

EXAMPLE 5

The same procedure is followed as described in Example 1 for both the preparation of the polyspirane resin and the wire enamel except that in substitution for the polyspirane resins prepared in the manner heretofore described, 150 gms. of poly(malondiylidene pentaerythritol) prepared in the following in the following manner is used:

Into a 5-liter, 3-neck, round-bottomed flask equipped with a motor driven stirrer, dropping funnel and stillhead, thermometer and connecting condenser 160 gms. of pentaerythritol is added, followed by 932 gms. of dry benzene. Next 256 gms. of the triethylmonomethyl diacetal of malonaldehyde is added to the reaction mixture followed by 4.2 gms. of p-toluenesulfonic acid. The reaction mixture is heated in a water bath maintained at 80–85° C. for approximately 2 hours until substantially all of the alcohol-benzene azeotrope with a boiling range of 55–72° C. has been distilled off. At this time 1745 gms. of cresylic acid is added to the reaction mixture along with a further 8.4 gms. of p-toluenesulfonic acid. The reaction mixture is then stirred at 80–90° C. until substantially all of the benzene-alcohol remaining in the reaction mixture is distilled off. A slight vacuum will aid distillation. The reaction mixture is then cooled, neutralized, diluted with 4 liters of water, and filtered for the isolation of the resin product. The resin after drying is a cream colored powder with a melting point of at least 300° C.

EXAMPLE 6

The same procedure is followed as described in Example 1 for both the preparation of the polyspirane resin and the wire enamel except that in substitution for poly-(glutardiylidene pentaerythritol) 150 gms. of poly(terephthaldiylidene pentaerythritol) prepared in the following manner is used:

Into a 3-liter, 3-necked, round-bottomed flask equipped with a reflux column is charged 158 gms. of pentaerythritol along with 780 gms. of a 20% by weight solution of terephthaldehyde in hot water and an additional 600 gms. of water. The mixture is heated to reflux and the contents stirred, by which time the pentaerythritol has all dissolved. The catalyst 2.7 gms. of phosphoric acid, a water soluble inorganic acid, is added to the boiling solution. The reaction is substantially completed within two hours. The resin is then filtered, washed with water until neutralized, and dried. The resin is a white powder with a melting point of at least 300° C.

EXAMPLE 7

The same procedure is followed as described in Example 1 for both the preparation of the polyspirane resin and the wire enamel except that in substitution for the poly(glutardiylidene pentaerythritol), 150 gms. of poly-(succindiylidene pentaerythritol) prepared in the following manner is used:

Into a 3-liter, 3-necked, round-bottomed flask equipped with a reflux column is charged 157 gms. of pentaerythritol along with 495 gms. of a 20% solution by weight of succinaldehyde in water and an additional 500 gms. of water. The mixture is heated to reflux and the contents stirred, by which time the pentaerythritol has dissolved. The catalyst 0.8 gm. of formic acid, a water soluble organic acid, is added to the boiling solution. The reaction is substantially completed within two hours. The resin is then filtered, washed with water until neutralized, and dried. The resin is a white powder with a melting point of at least 240° C.

EXAMPLE 8

The same procedure is followed as described in Example 1 for both the preparation of the polyspirane resin and the wire enamel except that in substitution for the poly(glutardiylidene pentaerythritol), 150 gms. of the copolymer product of equimolar portions of glutaraldehyde and 3-methyl glutaraldehyde and the pentaerythritol mixture is used. Also in substitution for the 488 ml. of cresylic acid and 155 ml. of naphtha used in that example, 214 ml. of cresylic acid and 429 ml. of naphtha are used in the preparation of the wire enamel.

EXAMPLE 9

The same procedure is followed as described in Example 2 for both the preparation of the polyspirane resin and the wire enamel except that in the latter preparation, 30 gms. of the phenol adduct of the reaction product between 1 mol of trimethylolpropane and 3 mols of tolylene diisocyanate is added to the cooling enamel batch following the pyromellitic dianhydride addition and before the filtration steps shown therein. The polyurethane is dissolved in a 50% by weight solution of equal portions of cresylic acid and naphtha before the addition to the enamel batch and is added to the latter with some stirring.

Wire samples made up of the heat cured product from the above batch in contrast to like samples made up from a batch containing the pyromellitic dianhydride but not containing the polyurethane had a wet dielectric strength of 2400 volts/mil in comparison to 1700 volts/mil for the latter.

EXAMPLE 10

The same procedure is followed as described in Example 2 for both the preparation of the polyspirane resin and the wire enamel except that in the latter preparation, 15 gms. of a meta-para-cresol-formaldehyde condensation product is added to the cooling enamel batch with some stirring following the pyromellitic dianhydride addition and before the filtration steps shown therein.

Wire samples made up of the heat cured product from the above batch in contrast to like samples made up from a batch containing pyromellitic dianhydride but not containing the meta-para-cresol-formaldehyde condensate had a 1 kv.-life at 240° C. of 150 hrs. in comparison to 110 hrs. for the latter.

EXAMPLE 11

The same procedure is followed as described in Example 2 for both the preparation of the polyspirane resin and the wire enamel except that in the latter preparation, 15 gms. of pyromellitic dianhydride is substituted for the 7.5 gms. used in Example 1 and 50 gms. of bisphenol A-epicholorhydrin epoxy resin is added to the batch with some stirring thereafter but before the filtration step.

Wire samples made up of the heat cured product from the above batch in contrast to like samples made up from a batch containing the same amount of pyromellitic dianhydride but not containing an epoxy resin had a wet dielectric strength of 3480 volts/mil in comparison to 1600 volts/mil for the latter.

EXAMPLE 12

The same procedure is followed as described in Example 1 for both the preparation of the polyspirane resin and the wire enamel except that with the latter preparation, 7.5 gms. of phthalic anhydride is substituted for the 7.5 gms. of pyromellitic dianhydride used in that example.

EXAMPLE 13

The same procedure is followed as described in Example 1 for both the preparation of the polyspirane resin and the wire enamel except that with the latter preparation, 3.0 gms. of methyl succinic anhydride is substituted for the 7.5 gms. of pyromellitic dianhydride used in that example.

EXAMPLE 14

The same procedure is followed as described in Example 1 for both the preparation of the polyspirane resin and the wire enamel except that with the latter preparation, 7.5 gms. of succinic anhydride is substituted for the 7.5 gms. of pyromellitic dianhydride used in that example.

EXAMPLE 15

The same procedure is followed as described in Example 1 for both the preparation of the polyspirane resin and the wire enamel except that with the latter preparation, 5.0 gms. of the copolymer of the 1:1 molar ratio of vinyl acetate and maleic anhydride is substituted for the 7.5 gms. of pyromellitic dianhydride used in that example.

EXAMPLE 16

The same procedure is followed as described in Example 1 for both the preparation of the polyspirane resin and the wire enamel except that with the latter preparation, 7.5 gms. of the copolymer of the 1:1 molar ratio of styrene and maleic anhydride is substituted for the 7.5 gms. of pyromellitic dianhydride used in that example.

EXAMPLE 17

The same procedure is followed as described in Example 1 for both the preparation of the polyspirane resin and the wire enamel except that with the latter preparation, 15.2 gms. of hexahydrophthalic anhydride is substituted for the 7.5 gms. of pyromellitic dianhydride used in that example.

EXAMPLE 18

The same procedure is followed as described in Example 1 for both the preparation of the polyspirane resin and the wire enamel except that with the latter preparation, 7.5 gms. of hexachloroendomethylenetetrahydrophthalic anhydride is substituted for the 7.5 gms. of pyromellitic dianhydride used in that example.

Other polyspiranes are suitable for the practice of this invention than those specifically shown in the examples and whose formulations will be obvious to the man skilled in the art after the following discussion. The dialdehyde component of the resin can be selected from the group consisting of (a) succinaldehyde, glutaraldehyde and mixtures thereof, suberic dialdehyde, azelaic dialdehyde, sebacic dialdehyde and mixtures thereof, (b) cyclopentanedial, cyclohexanedial, phthalic aldehydes and mixtures thereof, (c) mixtures of (a) and (b), (d) methyl and ethyl diacetals of malonaldehyde, succinaldehyde and glutaraldehyde, methyl and ethyl diketals of 2,4-pentanedione, 2,5-hexanedione and 2,6-heptanedione, and mixtures thereof, and (e) methyl and ethyl substituted products of (a) and (d). The pentaerythritol component of the polyspirane condensation product can be a material taken from the group consisting of monopentaerythritol and mixtures of monopentaerythritol with dipentaerythritol containing up to 50% dipentaerythritol by weight of the mixture. Acid catalysts suitable for the polyspirane reaction can be either inorganic acids such as hydrochloric, sulfuric and phosphoric acids or organic types such as oxalic, p-toluenesulfonic or formic acids. The acid concentration is not critical during the polymerization reaction. The preferred concentration of the polyspirane resin in the reaction products of this invention is about 50–99% by weight.

The class of polycarboxylic acid anhydride curing agents which are suitable for the polyspiranes of the present invention is a very large one and includes (a) polycarboxylic acid anhydrides of the saturated and unsaturated aliphatic series (b) aromatic polycarboxylic acid anhydrides (c) alicyclic acid anhydrides (d) substituted products of (a), (b) and (c), and (e) mixtures of (a), (b), (c) and (d). A limitation on the suitability of a material from the above class in the practice of this invention for the preparation of a solvent system type of wire enamel is that the particular acid anhydride curing agent be soluble in the solvent of the enamel system. Suitable examples of (a) above include succinic anhydride and maleic anhydride. Suitable examples of (b) above include pyromellitic dianhydride and phthalic anhydride. A suitable example of (c) above includes hexanhydrophthalic anhydride. Suitable examples of (d) include hexachloroendomethylenetetrahydrophthalic anhydride, tetrabromophthalic anhydride, methyl succinic anhydride and endomethylenetetrahydrophthalic anhydride.

The class of polymeric curing agents suitable for the practice of this invention includes copolymers of styrene-maleic anhydride and vinyl acetate-maleic anhydride.

Certain chemical compounds are useful additives to the polyspirane cure reaction system as promoters of the cure reaction. These promoters increase the rate of cure and thereby reduce the time needed for the cure reaction as well as improve certain properties of the cured resinous product. The class of chemical compounds useful as promoters of the polyspirane cure reaction in addition to the organic curing agents is a metallic salt of certain organic acids, which salt is also soluble in the liquid wire enamel system. The class of useful materials as promoters for the cure reaction can be further classified as resin driers or metal soaps which terms are in common usage in the art.

The metallic portions of the salt can be selected from the group consisting of lead, cobalt, manganese, calcium, zinc, iron and cerium. The acid portion of the salt can be selected from the group consisting of naphthenic acid, tall oil acids, 2-ethylhexoic acid and fatty acids. Suitable examples of the promoters, in addition to the zinc naphthenate used in Example 2, are available commercially and include cobalt naphthenate and manganese tallate.

The preferred range of concentration of the organic curing agent in the final resin product is 1–10% although compositions containing up to about 25% of this material are permissible in electrical insulation applications, above which concentration for the types of acidic curing agents shown, the dielectric properties of the resin product fall off sharply. It is obvious that mixtures of the acid anhydride curing agent materials described heretofore are suitable for the practice of this invention.

As was disclosed in the preceding examples, certain of the physical properties of the heat-cured polyspirane resin films were improved by the addition to the wire enamel of other polymeric materials. The specific polymers added were selected from the group consisting of polyisocyanates, phenolic resins and epoxy resins.

Other polyisocyanates are also suitable for the practice of this invention as substitutes for the particular one used in Example 9. They can be limited generally to those having two or more isocyanate groups either none or all of which reactive groups being blocked or hindered from immediate reaction by a previous reaction with a phenolic type modifier. The blocked isocyanates useful in this invention are polyurethanes which on heating from 100–250° C. yield a polyisocyanate. Other suitable polyisocyanates include compounds such as phenylene diisocyanates, tolylene diisocyanates, naphthalene diisocyanates, diphenylmethane diisocyanates, cyclohexane diol diisocyanates, ethylene diisocyanates, tetramethylene diisocyanates, hexamethylene diisocyanates, methylbenzene triisocyanates, polyisocyanates which are the partial reaction product of diisocyanates with polyhydric alcohols, and the like, and mixtures thereof.

The phenolic resins which are useful in the present invention can be limited to those soluble in the solvent systems employed for the preparation of the wire enamels. Such can readily be selected from the general class of phenolic aldehyde resins.

The phenolic portion of the resin in addition to the meta-para-cresol used in Example 10 may also be selected from the group consisting of xylenols, mixtures of phenol and cresol, and wood oil phenolic bodies, petroalkyl phenols, coal-tar phenol and others. The aldehyde portion of the resin in addition to the formaldehyde used in Example 10 may also be para-formaldehyde or other suitable aldehydes. The preferred composition of phenolic-aldehyde resin useful in this invention is obtained by reacting one mol of the phenolic compound with 0.7 to 2.0 mols of the suitable aldehyde.

The epoxy resins which are preferred in the practice of the present invention are those which can be represented by the following general formula:

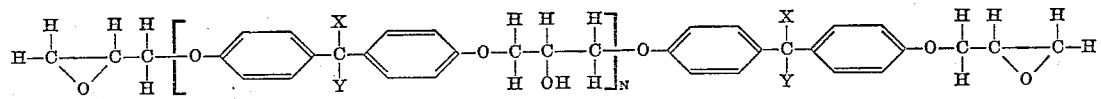

where X and Y are taken from the group consisting of hydrogen, methyl groups and aliphatic and aromatic hydrocarbons and N is an integer from 0 to 10. It is believed that non-resinous epoxy and poly-epoxy compounds are utilizable in this invention as well as other polymeric materials generally.

Both ionic and nonionic emulsifiers are suitable for the preparation of the polyspirane resin. The purpose of the emulsifier in the resin preparation is to increase the molecular weight of the resin by keeping it in contact with the reaction medium for a longer period of time than would ordinarily occur due to the general insolubility of the resin in an aqueous system. Suitable ionic emulsifiers would be sodium lauryl sulfate and dicocodimethylammoniumchloride. The emulsifier is useful in the preparation in a weight range of 0.1–10% of the combined weight of the aldehyde and pentaarythritol mixture used in the resin.

The naptha used in the preparation of the wire enamels is an aromatic liquid hydrocarbon of boiling range 150–184° C., derived from coal tar and/or petroleum. Other liquids which are suitable as diluents for the cresylic acid in the preparation of the wire enamels in this application are substituted and unsubstituted aromatic liquid hydrocarbons such as chlorobenzene, toluene and cumene, and such other solvents as furfuryl alcohol and furfural. The acceptable total solids range for wire enamels in this invention is 5 to 40 weight percent total solids.

The cresylic acid that is useful in the wire enamel preparation is a liquid phenolic compound consisting of primarily xylenols and cresols and having a boiling range of 195–227° C.

The poly(tetrafluoroethylene) used in Example 3 is commercially available. Suitable substitutes for this material in the practice of the invention are the polymers of ethylene and the halogenated derivative thereof. The presence of 0.5–5% by weight of these additives in the solid resinous product improves the abrasion resistance of films made therefrom.

The curing temperature required to obtain a continuous hard film for a polycarboxylic acid anhydride cured polyspirane system not containing solvents or other additives is generally limited to a temperature above the melting point of the particular resin used. At this temperature the acid anhydride material will have already catalyzed the cure reaction of the resin and have become a portion of the cured product. But at higher concentrations of a curing agent having a melting point lower than the particular polyspirane used it is possible that the melting point of the polyspirane will be lowered thereby and a cure effected at a temperature below the melting point of the polyspirane itself.

The coating compositions used in the preceding examples impose other limitations upon the curing temperature of the final resin product dependent upon such factors as the relative volatility of the particular solvent used and the reactivity of any other particular additive. Such other commercial factors as the type curing equipment to be used and the desired time to complete the cure reaction will also influence the cure temperature selected. For the compositions in the preceding examples a standard commercial type wire enamel tower was utilized, wherein operating temperatures of 300° C. to 400° C. were employed.

The exact curing temperatures of the above cured cross-linked films themselves were not determined during the wire tower runs. Even though the curing step was found to be a critical factor in producing good films, obtaining these temperatures is extremely difficult to do in such an apparatus because of the continuous travel of the coated wire through the tower during the curing process. Curing temperatures were obtained, however, for films of the composition disclosed in Example 1 which films were 0.001–0.005 of an inch thickness in air circulated oven for various curing periods and the properties of the cured films determined. Such films cured at 240° C. for periods of ½, 1, 2, 3, 4, and 5 hours did not have the flexibility of fully cured polyspirane systems. When the cure temperature was raised to 300° C., however, the films cured for a 10 minute period gave the acceptable flexibility and solvent resistance noted above. It is not intended to limit the curing temperature of the films in the present invention to a minimum of 300° C. by the above discussion, but rather to say that the cure temperature is greater than 240° C. It is also obvious from the above discussion that both the proper cure temperature and time of cure can be determined experimentally for the particular polyspirane system employed.

It is to be understood that this invention is not limited to the particular wire coating or wire size described above. It is obvious from the above test results that a wire coated with the polycarboxylic acid anhydride cured polyspirane enamel alone will be acceptable as class 155° C. (F) service wire and higher. But it is also obvious to the man skilled in the art to modify the application of the enamel so as to upgrade its high temperature usefulness by means of known practices in the field. It is possible for instance to utilize the present coating as an undercoat on a wire to apply as an overcoat one or more of the many compatible insulating varnishes and thereby obtain a coating acceptable at even higher operating temperatures. It is also not intended to limit the application of the resin as an electrical insulation for wire merely. It is possible by means of extrusion, dipping, casting and other known means to form insulation from this material that is useful in such electrical applications as slot liners, encapsulation, sheet insulation, and surface coatings. The resin can also be used as an adhesive agent in the bonding of electrical parts that expect use at elevated temperatures. Further use can be made of the invention as insulation and/or impregnating varnishes for such articles as glass tapes and electrical coils. Other non-electrical uses of this resin are apparent where chemical resistance and temperature stability of the final product are needed, such as surface coatings and others.

In addition to the various applications for which this resin is particularly suitable as hereinbefore described, it will be obvious to the man skilled in the art that not only other applications are apparent but that other compositions or other processes for the manufacture of those compositions are likewise within the scope of this invention.

What is claimed is:

1. A composition of matter comprising the crosslinked insoluble reaction product of a polyspirane resin having the general formula

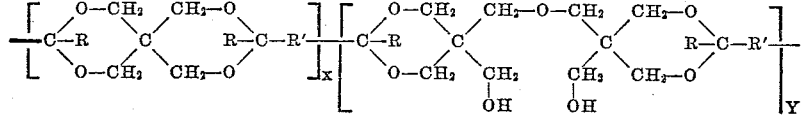

where R is taken from the group consisting of H and $CH_3$, R' is taken from the group consisting of aliphatic hydrocarbons defined by $(CH_2)_S$, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, with an organic material selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b), and (c), (e) polymeric polyanhydrides selected from the class consisting of soluble copolymers of styrene-maleic anhydride and vinyl acetate-maleic anhydride and (f) mixtures of (a), (b), (c), (d) and (e).

2. A composition of matter as in claim 1 wherein the organic material is an aliphatic polycarboxylic acid anhydride.

3. A composition of matter as in claim 1 wherein the organic material is an aromatic polycarboxylic acid anhydride having a single benzene ring.

4. A composition of matter as in claim 1 wherein the organic material is a polymeric polyanhydride selected from the group consisting of styrene-maleic anhydride and vinyl acetate-maleic anhydride.

5. A composition of matter as in claim 1 wherein the organic material is an alicyclic polycarboxylic acid anhydride.

6. A composition of matter as in claim 1 wherein the polyspirane resin comprises poly(glutardiylidene pentaerythritol).

7. A composition of matter as in claim 1 wherein the polyspirane resin comprises poly(3-methylglutardiylidene pentaerythritol).

8. A composition of matter as in claim 1 wherein the polyspirane resin comprises poly(malondiylidene pentaerythritol).

9. A composition of matter as in claim 1 wherein the polyspirane resin comprises the copolymer of equimolar portions of glutaraldehyde and 3-methylglutaraldehyde with a mixture of 88 parts by weight of monopentaerythritol and 12 parts of dipentaerythritol.

10. A composition of matter as in claim 1 wherein the polyspirane resin comprises poly(succindiylidene pentaerythritol).

11. A composition of matter comprising the crosslinked insoluble reaction product of a polyspirane resin having the general formula which reaction product also containing 1.0 to 10 percent by weight of a cure promoter.

12. A composition of matter as in claim 1 wherein the reaction product contains in parts by weight about 75-99 parts of the polyspirane and about 1-25 parts of the organic material.

13. A composition of matter as in claim 12 wherein the solid resinous product contains about 0.5-5% of the compound taken from the group consisting of polymers of ethylene and halogenated derivatives thereof.

14. The crosslinked insoluble reaction product of a polyspirane having the general formula

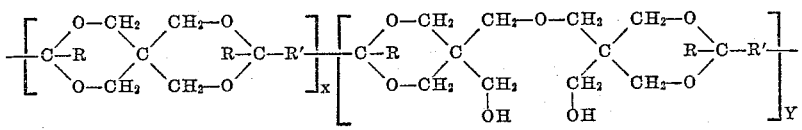

where R is taken from the group consisting of H and $CH_3$, R' is taken from the group consisting of aliphatic hydrocarbons defined by $(CH_2)_S$, where S is an integer from 0-8 and alicyclic and aromatic hydrocarbons of 5-6 carbon atoms, and methyl and ethyl substituted products thereof, X plus Y is equal to an integer from 2-100 and Y is equal to no more than 50% of X plus Y, a polyisocyanate and an organic material wherein the organic material is selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b) and (c), (e) polymeric polyanhydrides

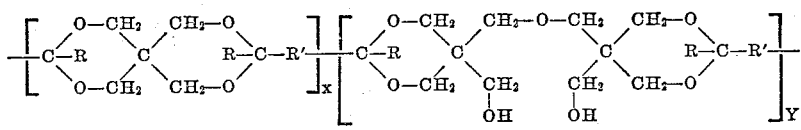

where R is taken from the group consisting of H and $CH_3$, R' is taken from the group consisting of aliphatic hydrocarbons defined by $(CH_2)_S$, where S is an integer from 0-8 and alicyclic and aromatic hydrocarbons of 5-6 carbon atoms, and methyl and ethyl substituted products thereof, X plus Y is equal to an integer from 2-100 and Y is equal to no more than 50% of X plus Y, with an organic material selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b) and (c), (e) polymeric polyanhydrides selected from the class consisting of soluble copolymers of styrene-maleic anhydride and vinyl acetate-maleic anhydride, and (f) mixtures of (a), (b), (c), (d) and (e), selected from the class consisting of soluble copolymers of styrene maleic anhydride and vinyl acetate-maleic anhydride and (f) mixtures of (a), (b), (c), (d) and (e).

15. A product as in claim 14 wherein the polyisocyanate is selected from the group consisting of polyisocyanates and blocked derivatives of polyisocyanates.

16. A product as in claim 14 wherein the polyisocyanate is the phenol adduct of the reaction product of 1 mol of trimethylolpropane and 3 mols of tolylene diisocyanate.

17. A product as in claim 14 comprising in parts by weight 100 parts of the polyspirane, 1-50 parts of the polyisocyanate, and 1-35 parts of the organic material.

18. The crosslinked reaction product of a polyspirane having the general formula

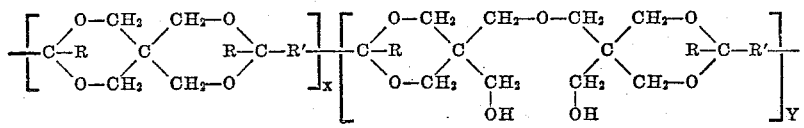

where R is taken from the group consisting of H and CH₃, R' is taken from the group consisting of aliphatic hydrocarbons defined by (CH₂)ₛ, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, 2,2'-bis(p-hydroxyphenyl) propane-epichlorohydrin, epoxy resin and an organic material wherein the organic material is selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b), and (c), (e) polymeric polyanhydrides selected from the class consisting of soluble copolymers of styrene maleic anhydride and vinyl acetate-maleic anhydride and (f) mixtures of (a), (b), (c), (d) and (e).

19. A product as in claim 18 comprising in parts by weight 100 parts of the polyspirane, 1–50 parts of the epoxy resin, and 1–35 parts of the organic material.

20. A product as in claim 18 wherein the epoxy resin portion has the general formula

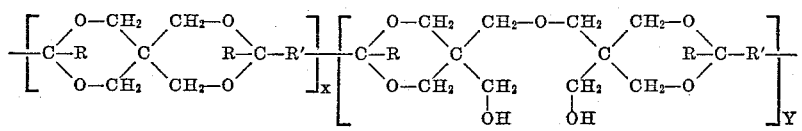

where X and Y are taken from the group consisting of hydrogen, methyl groups and aliphatic and aromatic hydrocarbons and N is an integer from 0 to 10.

21. The crosslinked insoluble reaction product of a polyspirane having the general formula

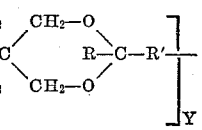

where R is taken from the group consisting of H and CH₃, R' is taken from the group consisting of aliphatic hydrocarbons defined by (CH₂)ₛ, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, a phenolic-aldehyde resin and an organic material wherein the organic material is selected from the group consisting of (a) polycarboxylic acid anhydrides of the saturated and unsaturated aliphatic series, (b) aromatic polycarboxylic acid anhydride, (c) alicyclic polycarboxylic acid anhydrides, (d) methyl and halogen substituted products of (a), (b) and (c), (e) polymeric polyanhydrides selected from the class consisting of soluble copolymers of styrene-maleic anhydride and vinyl acetate-maleic anhydride, and (f) mixtures of (a), (b), (c), (d) and (e).

22. A product as in claim 21 wherein the phenolic aldehyde resin is the reaction product of 1 mol of the phenolic compound with 0.7 to 2.0 mols of formaldehyde.

23. A product as in claim 21 comprising in parts by weight 100 parts of the polyspirane, 1–25 parts of the phenolic aldehyde resin, and 1–35 parts of the organic material.

24. A process for the manufacture of a solid resinous product comprising the solution of a polyspirane resin having the general formula

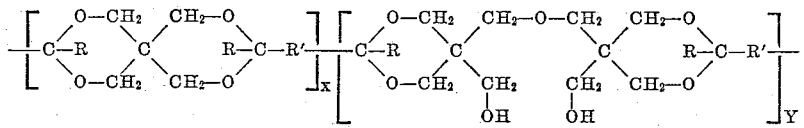

where R is taken from the group consisting of H and CH₃, R' is taken from the group consisting of aliphatic hydrocarbons defined by (CH₂)ₛ, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, in a mixture of cresylic acid and a diluent therefor, thereafter adding to the solution a soluble material selected from the group consisting of (I) (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b) and (c), (e) polymeric anhydrides selected from the class consisting of soluble copolymers of styrene-maleic anhydride and vinyl acetate-maleic anhydride and (f) mixtures of (a), (b), (c), (d) and (e) and (II) (a) a material selected from (I) and a phenolic-aldehyde resin, (b) a material selected from (I) and a 2,2'-bis(p-hydroxyphenyl)propane-epichlorohydrin epoxy resin and (c) a material selected from (I) and a polyisocyanate; finally removing the solvent from the solution and heat curing the remaining resin.

25. A coating composition comprising an organic solvent solution of a polyspirane having the general formula

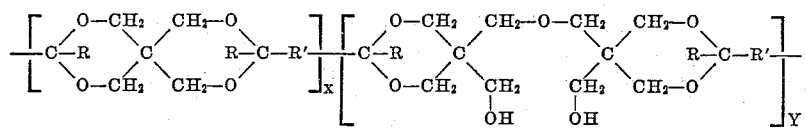

where R is taken from the group consisting of H and CH₃, R' is taken from the group consisting of aliphatic hydrocarbons defined by (CH₂)ₛ, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y, and an organic material selected from the group consisting of (a) polycarboxylic acid anhydride of the saturated and unsaturated aliphatic series, (b) aromatic carboxylic acid anhydrides, (c) alicyclic polycarboxylic acid anhydrides, (d) methyl and halogen substituted acid products of (a), (b), and (c), (e) polymeric polyanhydrides of soluble copolymers of styrene-maleic anhydride and vinyl acetate-maleic anhydride and (f) mixtures of (a), (b), (c), (d) and (e).

26. Electrical insulation comprising the reaction product of a polyspirane having the general formula

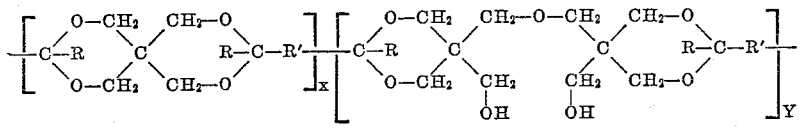

where R is taken from the group consisting of H and CH₃, R' is taken from the group consisting of aliphatic hydrocarbons defined by (CH₂)$_S$, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y and an organic material selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b) and (c), (e) polymeric polyanhydrides selected from the class consisting of soluble copolymers of styrene-maleic anhydride and vinyl acetate-maleic anhydride and (f) mixtures of (a), (b), (c), (d), and (e).

27. An electrical conductor insulated with an organic insulation comprising the reaction product of a polyspirane having the general formula

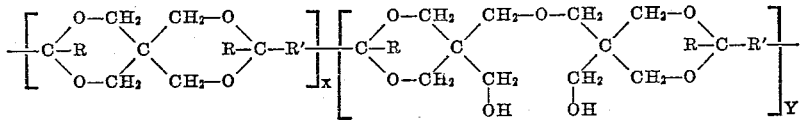

where R is taken from the group consisting of H and CH₃, R' is taken from the group consisting of aliphatic hydrocarbons defined by (CH₂)$_S$, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y and an organic material selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b) and (c), (e) polymeric polyanhydrides selected from the class consisting of soluble copolymers of styrene-maleic anhydride and vinyl acetate-maleic anhydride, and (f) mixtures of (a), (b), (c), (d) and (e).

28. A coated electrical conductor consisting of a bare metal wire and a coating comprising the reaction product of a polyspirane having the general formula

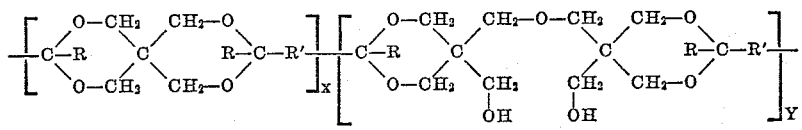

where R is taken from the group consisting of H and CH₃, R' is taken from the group consisting of aliphatic hydrocarbons defined by (CH₂)$_S$, where S is an integer from 0–8 and alicyclic and aromatic hydrocarbons of 5–6 carbon atoms, and methyl and ethyl substituted products thereof, X plus Y is equal to an integer from 2–100 and Y is equal to no more than 50% of X plus Y and an organic material selected from the group consisting of (a) polycarboxylic acid anhydrides of the saturated and unsaturated aliphatic series, (b) aromatic polycarboxylic acid anhydrides, (c) alicyclic polycarboxylic acid anhydrides, (d) methyl and halogen substituted products of (a), (b), and (c), (e) polymeric polyanhydrides selected from the class consisting of soluble copolymers of styrene-maleic anhydride and vinyl acetate-maleic anhydride, and (f) mixtures of (a), (b), (c), (d) and (e).

References Cited in the file of this patent

UNITED STATES PATENTS

| | | |
|---|---|---|
| 2,643,236 | Kropa et al. | June 23, 1953 |
| 2,739,972 | Abbott et al. | Mar. 27, 1956 |
| 2,785,996 | Kress et al. | Mar. 19, 1957 |
| 2,895,945 | Fischer et al. | July 21, 1959 |